(12) United States Patent
Olainu et al.

(10) Patent No.: US 11,500,863 B2
(45) Date of Patent: Nov. 15, 2022

(54) FIELD INHERITANCE REMOVAL SYSTEM

(71) Applicant: Hippo Analytics Inc., Palo Alto, CA (US)

(72) Inventors: Adrian Olainu, Sunnyvale, CA (US); Aviad Pinkovesky, Mountain View, CA (US)

(73) Assignee: Hippo Analytics Inc., Palo Alto, CA (US)

( * ) Notice: Subject to any disclaimer, the term of this patent is extended or adjusted under 35 U.S.C. 154(b) by 109 days.

(21) Appl. No.: 17/068,341

(22) Filed: Oct. 12, 2020

(65) Prior Publication Data

US 2022/0114166 A1 Apr. 14, 2022

(51) Int. Cl.
*G06F 16/23* (2019.01)
*G06F 16/21* (2019.01)
*G06F 16/2458* (2019.01)
*G06F 16/2455* (2019.01)

(52) U.S. Cl.
CPC ........ *G06F 16/2393* (2019.01); *G06F 16/212* (2019.01); *G06F 16/2474* (2019.01); *G06F 16/24564* (2019.01)

(58) Field of Classification Search
CPC ............. G06F 16/2365; G06F 16/212; G06F 16/2264; G06F 16/2393; G06F 16/24564; G06F 16/2474
See application file for complete search history.

(56) References Cited

U.S. PATENT DOCUMENTS

| | | | |
|---|---|---|---|
| 6,789,252 B1* | 9/2004 | Burke | G06F 8/10 717/103 |
| 8,380,600 B1* | 2/2013 | Blum | G06Q 40/02 705/26.81 |
| 8,620,959 B1* | 12/2013 | Denton, III | G06F 16/25 703/3 |
| 9,015,107 B2* | 4/2015 | Hughes | G06F 16/213 707/803 |
| 9,589,291 B1* | 3/2017 | Yalamanchi | G06Q 30/0625 |
| 10,425,350 B1* | 9/2019 | Florissi | H04L 47/762 |
| 2005/0137887 A1* | 6/2005 | Porter | G06Q 30/0601 705/26.1 |
| 2007/0276869 A1* | 11/2007 | Charlson | G16H 10/20 |

(Continued)

*Primary Examiner* — Mark D Featherstone
*Assistant Examiner* — Kweku William Halm
(74) *Attorney, Agent, or Firm* — Schwegman Lundberg & Woessner, P.A.

(57) ABSTRACT

A computer system stores a database of multi-dimensional variables indicating field values of rate plan objects. The database stores rules related to each rate plan object. The computer system forms a primary catalog comprising all of the multi-dimensional variables from all rate plan objects from the database. The computer system receives a first user input indicating a first plurality of field entries. The computer system forms a secondary catalog that inherits all rate plan objects of the primary catalog. The computer system identifies, in the secondary catalog, first fields values that do not correspond to the first plurality of field entries based on the rules for the rate plan objects corresponding to the first plurality of field entries. The identified first fields values are removed from the secondary catalog. A second rate plan object is formed based on the secondary catalog.

19 Claims, 13 Drawing Sheets

(56) References Cited

U.S. PATENT DOCUMENTS

| | | | |
|---|---|---|---|
| 2009/0177301 A1* | 7/2009 | Hayes | G11B 19/025 707/999.005 |
| 2015/0142804 A1* | 5/2015 | Sabbouh | G06F 9/4493 707/737 |
| 2015/0178052 A1* | 6/2015 | Gupta | G06F 8/34 717/105 |
| 2016/0180418 A1* | 6/2016 | Jaeger | G06Q 30/0617 705/26.1 |
| 2018/0150362 A1* | 5/2018 | Lee | G06F 11/2097 |

* cited by examiner

FIELD INHERITANCE REMOVAL SYSTEM

TECHNICAL FIELD

The subject matter disclosed herein generally relates to a computer for updating a catalog of features in a database and, in particular, to a computer system and method that removing field and field values inherited from a catalog object.

BACKGROUND

A programming object can be used to store a sequence of events such as updates to attributes of the objects over time. However, multi-dimensional attributes that depend on other attributes do add a level of complexity when the object is to be updated because the value of an attribute depends on the value of another attribute. As such, a programmer that seeks to access a snapshot of the programming object at a specific point in time may have to manually reconstruct the programming object based on the values of the attributes at the specific point in time.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
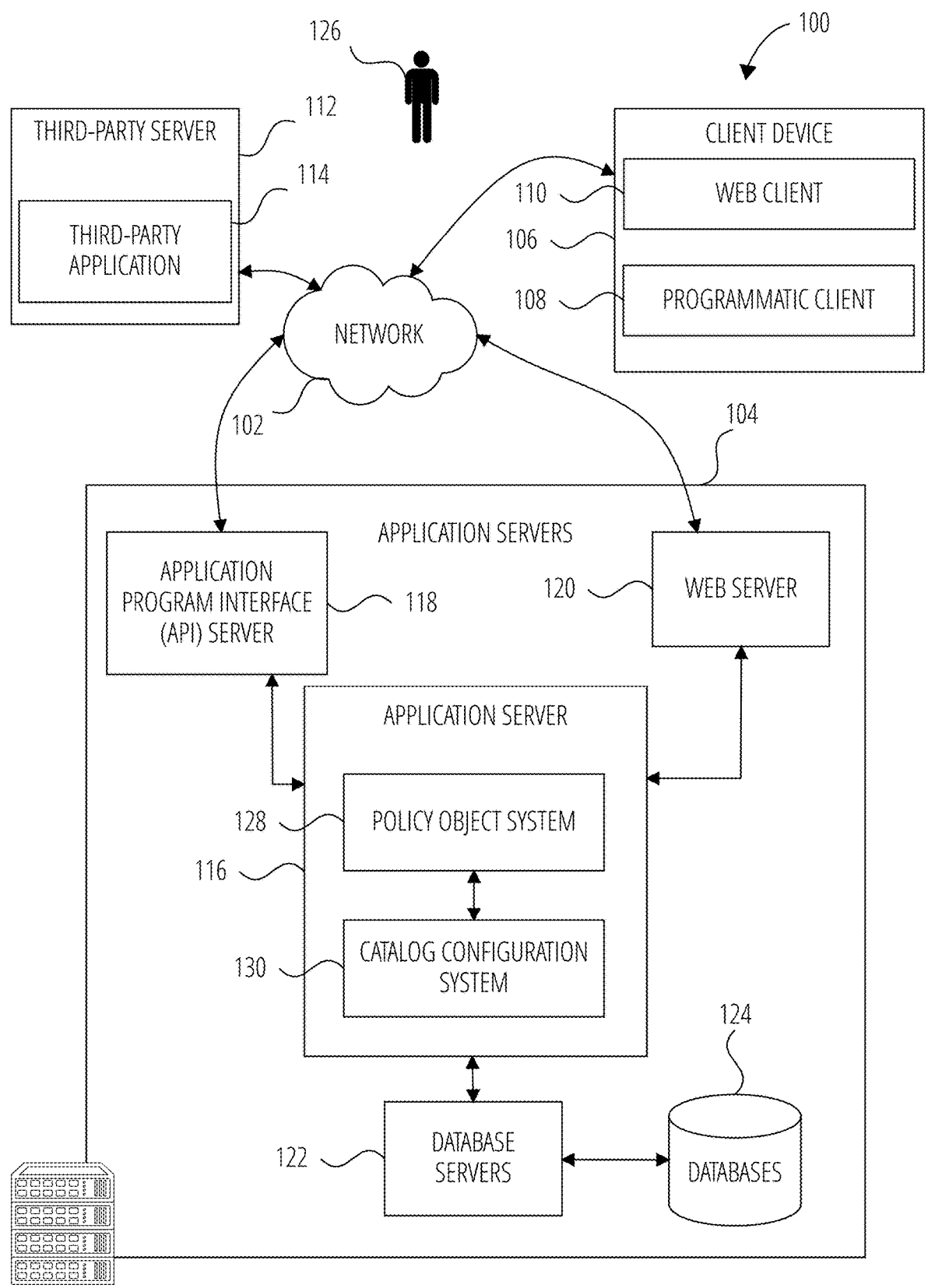
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Updates to objects in a database can be difficult given the large amount of objects, attributes, and inter-dimensionality of some values of the objects. In one example embodiment, the present application describes a system and method for forming rate plan objects based on inherited fields from a primary catalog. In particular, the rate plan objects inherit all properties (e.g., fields, field values, rules) from a primary catalog. A computer system receives user input and removes fields that are not applicable based on user input to form a new rate plan object. In another example embodiment, the present application describes a system and method for forming rate plan objects based on user input. The system identifies fields based on the user input and retrieves the corresponding field values from a primary catalog of rate plan objects. As such, the system explicitly includes only fields that are relevant based on the user input.

In one example embodiment, a computer system stores a database of multi-dimensional variables indicating field values of rate plan objects. The database stores rules related to each rate plan object. The computer system forms a primary catalog comprising all of the multi-dimensional variables from all rate plan objects from the database. The computer system receives a first user input indicating a first plurality of field entries. The computer system forms a secondary catalog that inherits all rate plan objects of the primary catalog. The computer system identifies, in the secondary catalog, first fields values that do not correspond to the first plurality of field entries based on the rules for the rate plan objects corresponding to the first plurality of field entries. The identified first fields values are removed from the secondary catalog. A second rate plan object is formed based on the secondary catalog.

As a result, one or more of the methodologies described herein facilitate solving the technical problem of forming an object by removing (non-applicable or relevant) fields and field values that are inherited from a primary catalog of rate plan objects. Other technical problems include updating an object without having to specify all attributes in an update to the object. Furthermore, changes to the object traditionally involve a team of programmers searching for the pertinent object and manually updating values of each attributes of the object. As such, one or more of the methodologies described herein may obviate a need for certain efforts or computing resources that otherwise would be involved in specifying every attributes of an object and requiring user intervention to update values of objects. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed.

One or more application servers 104 provide server-side functionality via a network 102 to a networked user device, in the form of a client device 110. A web client 110 (e.g., a browser) and a programmatic client 108 (e.g., an "app") are hosted and execute on the web client 110.

An Application Program Interface (API) server 118 and a web server 120 provide respective programmatic and web interfaces to application servers 104. A specific application server 116 hosts a policy object system 128 and a catalog configuration system 130, which each includes components, modules and/or applications. The catalog configuration system 130 generates and maintains a product information based on input from a user of the policy object system 128. For example, the policy object system 128 enables an administrator (e.g., user 126) to provide or quote an insurance policy based on parameters/information provided a customer. The policy object system 128 enables an administrator to make changes to the policy based on updated information provided at the policy object system 128.

The web client 110 communicates with the application server 116 via the web interface supported by the web server 120. Similarly, the programmatic client 108 communicates with the application server 116 via the programmatic interface provided by the Application Program Interface (API) server 118.

The application server 116 is shown to be communicatively coupled to database servers 122 that facilitates access to an information storage repository or databases 124. In an example embodiment, the databases 124 includes storage devices that store information to be published and/or processed by the catalog configuration system 130.

Additionally, a third-party application 114 executing on a third-party server 112, is shown as having programmatic access to the application server 116 via the programmatic interface provided by the Application Program Interface (API) server 118. For example, the third-party application 114, using information retrieved from the application server 116, may supports one or more features or functions on a website hosted by the third party. In another example, the third-party server 112 stores the policy object system 128 or another application that interfaces with the catalog configuration system 130.

Any of the systems or machines (e.g., databases, devices, servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 13, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and types of client device 106 may be embodied within the network environment 100. Furthermore, some components or functions of the network environment 100 may be combined or located elsewhere in the network environment 100. For example, some of the functions of the client device 106 may be embodied at the application server 116.

Figure 2:
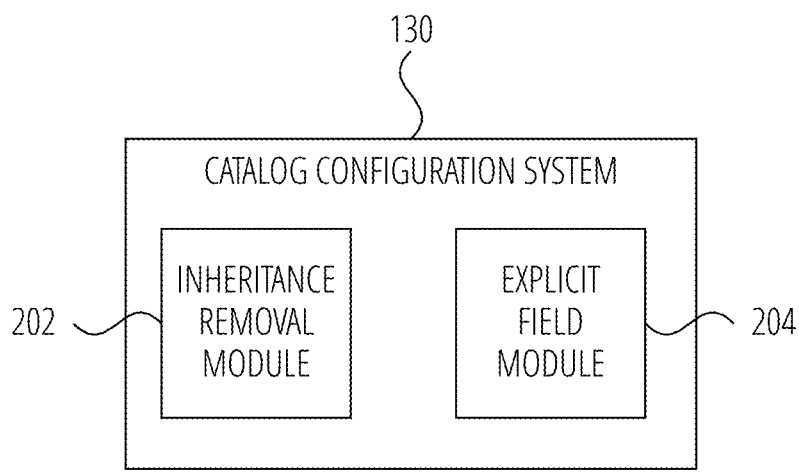
FIG. 2 illustrates a catalog configuration system in accordance with one example embodiment.

FIG. 2 illustrates a catalog configuration system in accordance with one example embodiment. The catalog configuration system 130 includes an inheritance removal module 202 and an explicit field module 204. The catalog configuration system 130 stores at databases 124, a database of multi-dimensional variables indicating field values of a first rate plan object. For example, the rate plan objects includes table of field values for different fields (e.g., age, rate, zip code, etc.). The databases 124 store rules related to each rate plan object. For example, a rule may dictate that a rate may be discounted if no claims has been filed for the property within the last three years. Other rules may be based on other fields (e.g., age of property, alarm installed, good student, and so forth).

The catalog configuration system 130 forms a primary catalog comprising all of the multi-dimensional variables from all rate plan objects stored in the databases 124. For example, the primary catalog includes rate plan object for all ages of insured user, all income brackets of insured user, every state, zip code, type of home (e.g., condominium, single family home) in the United States.

The inheritance removal module 202 receives a first user input indicating a first plurality of field entries (e.g., age, sex, zip code of insured property). The inheritance removal module 202 forms a secondary catalog that inherits all properties (e.g., all fields and field values) of the primary catalog. The inheritance removal module 202 identifies fields (in the secondary catalog) that are not applicable or that do not correspond to the first plurality of field entries. In another example, the inheritance removal module 202 identifies fields that do not apply based on rules (e.g., discount for advance purchase of policy, discount based on predefined criteria). The inheritance removal module 202 removes the inherited fields and corresponding field values from the secondary catalog that are identified as not applicable or not relevant/pertinent to the first user input. The inheritance removal module 202 forms a second rate plan object based on the secondary catalog. For example, the second rate plan includes rates from field values in the secondary catalog.

The following example illustrates an example of removing inherited fields:

'workers_comp_detials_section': {remove_element: false},
'property_data.no_mortgage_discount': {remove_element: true},
'property_data.water_leak_device': {remove_element: true}, The explicit field module 204 receives a first user input indicating a first plurality of field entries (e.g., age, sex, zip code of insured property). The explicit field module 204 forms a secondary catalog that is initially null (or does not include any fields or field values). The explicit field module 204 identifies fields (from the primary catalog) that are applicable or that do correspond to the first plurality of field entries. In another example, the explicit field module 204 identifies fields that do apply based on rules (e.g., discount for advance purchase of policy, discount based on predefined criteria such as age is between a predefined range). The explicit field module 204 adds the identified fields and corresponding field values to the secondary catalog based on the first user input. The explicit field module 204 forms a second rate plan object based on the secondary catalog. For example, the second rate plan includes rates from field values in the secondary catalog.

Figure 3:
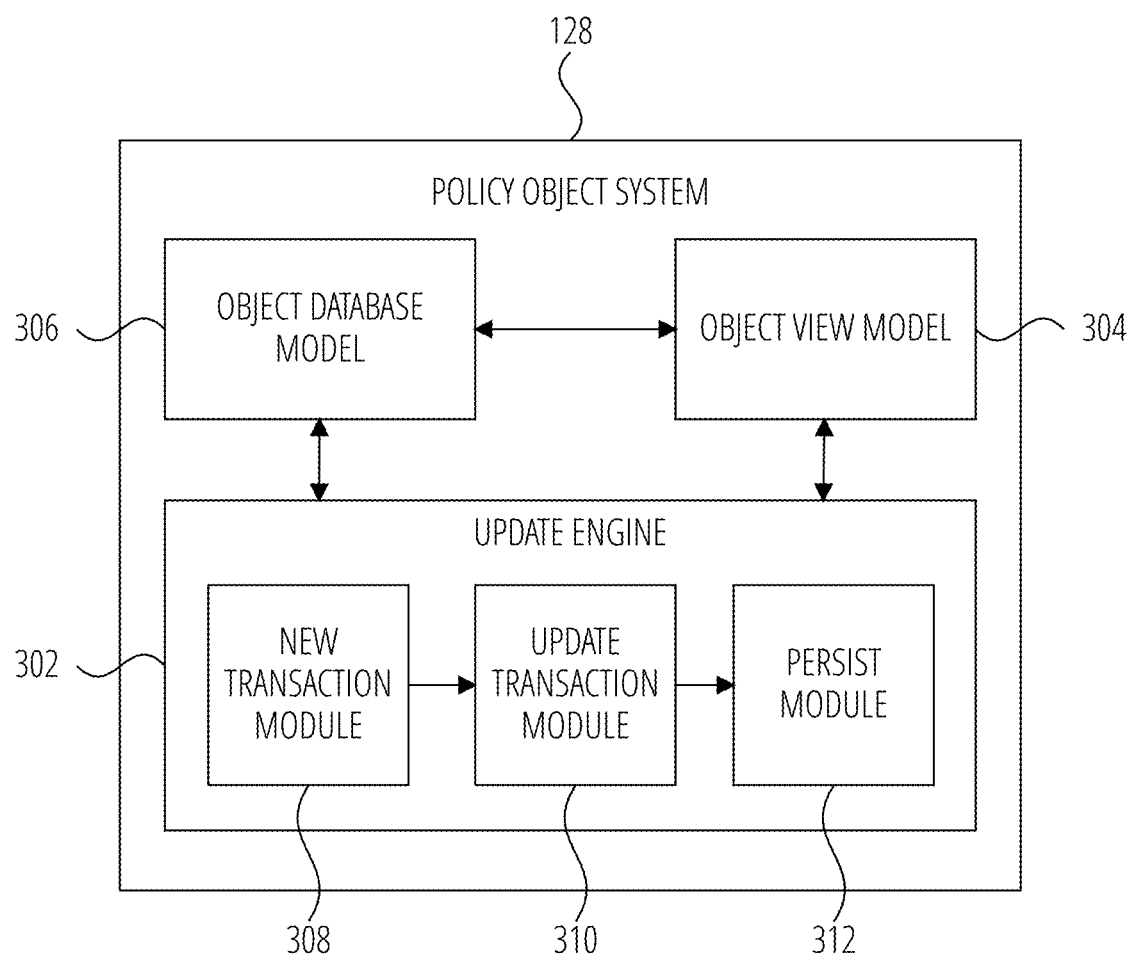
FIG. 3 illustrates a policy object system in accordance with one example embodiment.

FIG. 3 illustrates a policy object system 128 in accordance with one example embodiment. The policy object system 128 includes an object database model 306, an object view model 304, and an update engine 302.

The object database model 306 forms a database model for each object. For example, each object is defined based on a plurality of sequential updates that identify the field of change (e.g., value change of an attribute and attribute, transaction date, effective date). As such, the entire data for every attribute does not need to be copied or replicated in the object in order to reflect current values of the object.

The following pseudo-code illustrates an example of updates to a policy object:

```
Policy DB model
policy = {
    updates = [
        {
            bound: true,
            ts: 0,
            effective_date: 0,
            data: {
                discount_1: false,
                discount_2: false,
                property_data: {
                    address: {
                        city,
                    },
                    rce: 100000,
                },
                cov_a: 100000,
                premium: {
                    total: 1,000,
                }
            }
        },
        {
            bound: true,
            ts: 183,
            effective_date: 183,
            data: {
                discount_2: true,
            }
        },
        {
            bound: true,
            ts: 200,
            effective_date: 0,
            data: {
                cc_token: 'abc',
            }
        },
        {
            bound: true,
            ts: 240,
            effective_date: 240,
            data: {
                property_data: {
                    rce: 50,000
                },
                cov_a: 75000,
                premium: {
                    total: 900,
                }
            }
```

Each update from the example above includes a bound attribute that indicates that the corresponding update is immutable or cannot be changed, a transaction date attribute (e.g., ts) that indicates when the update was entered into the object model, the effective date attribute (e.g., effective_date) that indicates an effective date for the policy for the data set forth in the update. Examples of data (to be updated) include property reconstruction estimate (e.g., rce), coverage limit (e.g., cov_a), and policy premium. The transaction data attribute is also referred to as a timestamp attribute.

The object view model 304 enables a user to access a snapshot of the object at a specific point in time. In one example, the object view model 304 reconstruct a final version of the object by iteratively projecting the values of the attributes for each update into the final version of the object.

For example, the object database model 306 generates a view of the object with the attribute values corresponding to the specific point in time that is specified in a query from an administrator (e.g., a user of the policy object system 128/catalog configuration system 130). In another example embodiment, the object database model 306 produces a latest version of the object with the corresponding attribute values. As such, the object database model 306 enables a user to track a state of object. In one example, the object may represent attributes of a product (e.g., physical product specification, insurance policy, agreement, etc.). In the example of the insurance policy, an administrator of the policy object system 128 uses the object database model 306 to retrieve a latest state of the insurance policy (e.g., policy is active, coverage is $100,000). In another example, the administrator uses the object database model 306 to retrieve a state of the insurance policy at a specified point in time (e.g., policy had a coverage of $80,000 on date D).

The following pseudo-code illustrates an example of updates to a policy object:

```
// Policy View Model
policyInfo = policy.getPolicyInfo( );
policyInfo: {
    data: {
        cov_a: 75000,
        discount_1: false,
        discount_2: true,
        property_data: {
            address: {
                city,
            },
            rce: 50000,
        },
        cc_token: 'abc',
    }
}
```

The update engine 302 enables an administrator to update the object (for the update to be effective at a future date, at a present time, or retroactively). Because the object may be multidimensional and be subject to certain rules. For example, the value of one attribute may depend on the value of another attribute. As such, the update engine 302 verifies that the changed value in one attribute is valid based on the relationship between the attributes and their corresponding values, prior to generating/committing the update to the object. For example, the value of one attribute cannot exceed 1.5 times the value of another attribute.

In one example embodiment, the update engine 302 includes a new transaction module 308, an update transaction module 310, and a persist module 312. The new transaction module 308 detects that the administration is submitting a new update entry. In response, the new transaction module 308 generates a new transaction field for the object. The new transaction field includes the effective date but does not identify what other attributes of the object are to be updated.

The following pseudo-code illustrates an example of a new transaction field:

```
start new transaction
{
    effective_date: 240,
}
```

The update transaction module 310 generates an update for the object based on the new transaction and validates the updates. An example operation of the update transaction module 310 is described below with respect to FIG. 4.

The persist module 312 binds or commits the update to the object. In one example, the persist module 312 adds the update to the object and specifies that the update is immutable. The object view model 304 may construct a latest version of the object based on all the updates in the object.

Figure 4:
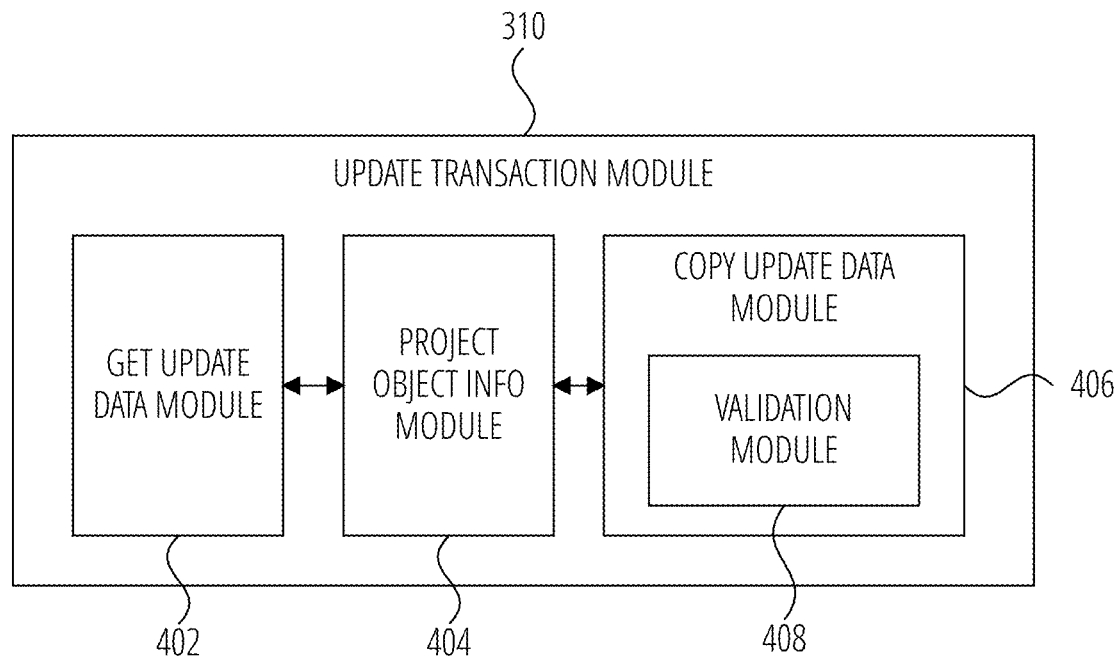
FIG. 4 illustrates an update transaction module in accordance with one example embodiment.

FIG. 4 illustrates an update transaction module 310 in accordance with one example embodiment. The update transaction module 310 includes a get update data module 402, a project object info module 404, and a copy update data module 406.

The get update data module 402 retrieves the new value of an attribute of the object. For example, the new value of a reconstruction estimate has decreased to $50.000.

The project object info module 404 communicates with the object view model 304 to project the object based on the current updates and the new value in the new update).

The copy update data module 406 validates the new value of the update. For example, the copy update data module 406 accesses a rule definition or database and values of other attributes of the object to determine the validity of the new value. In one example, the rule definition describes that the value of attribute A has to be at least two times greater than the value of attribute B.

In one example embodiment, the copy update data module 406 includes a validation module 408 that performs the validation of the new entry (e.g., new value of an attribute) based on the rule definition. If the validation module 408 cannot validate the new value of an attribute in the update, the copy update data module 406 generates an error notification indicating that the new value does not confirm with the rule definition.

If the validation module 408 validates the new value of an attribute in the update, the copy update data module 406, the copy update data module 406 updates the object with the new value (e.g., adjusting a coverage value) and persist the object to the databases 124.

Figure 5:
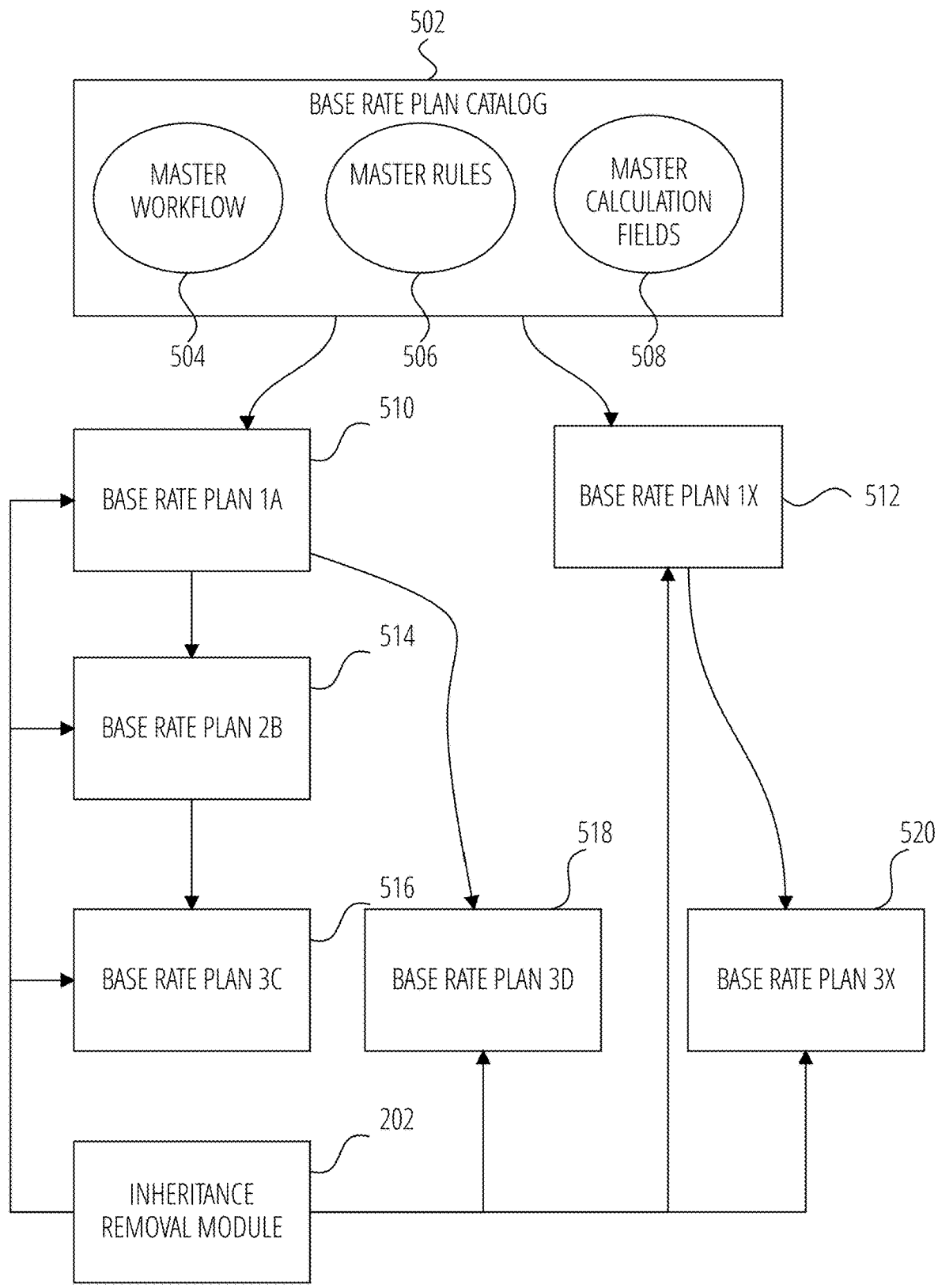
FIG. 5 illustrates an example of an inheritance system in accordance with one example embodiment.

FIG. 5 illustrates an example of an inheritance system in accordance with one example embodiment. A base rate plan catalog 502 includes a master workflow 504, a master rules 506, and a master calculation fields 508. The master workflow 504 identifies a workflow for identifying rate plans and computing a rate for a user based on a user input. The master rules 506 identifies rules related to each rate plan. The master calculation fields 508 identifies all fields applicable to all rate plans. As such, the base rate plan catalog 502 includes comprehensive data for computing rate plans based on all scenarios (e.g., property in any states, all ages of the property, all types of roof).

The catalog configuration system 130 forms a base rate plan 1A 510 based on inherited properties (e.g., field and corresponding field values) from the base rate plan catalog 502. In one example, the catalog configuration system 130 removes inherited properties that do not apply to a user input/user query. For example, the inheritance removal module 202 removes all field values of all rate plans for properties outside California for a user input that indicates a California property.

The catalog configuration system 130 forms a base rate plan 2B 514 based on inherited properties from the base rate plan 1A 510. For example, the base rate plan 2B 514 is based on a tile roof of the property provided in further user input. The inheritance removal module 202 removes all field values of all rate plans for property with non-tile roof.

The catalog configuration system 130 forms a base rate plan 3C 516 based on inherited properties from the base rate plan 2B 514. For example, the base rate plan 3C 516 is based on an alarm discount triggered by further user input indicating an alarm system at the property. The inheritance removal module 202 removes all field values of all rate plans for non-alarm properties. As such, the base rate plan 3C 516 is based on a property that includes a tile-roof and an alarm system.

The catalog configuration system 130 forms a base rate plan 3D 518 based on inherited properties from the base rate plan 1A 510. For example, the base rate plan 3D 518 is based on an alarm discount triggered by further user input indicating an alarm system at the property. The inheritance removal module 202 removes all field values of all rate plans for non-alarm properties. As such, the base rate plan 3C 516 is based on a property that includes any type of roof and an alarm system.

The catalog configuration system 130 forms a base rate plan 1x 512 based on inherited properties from the base rate plan catalog 502. For example, the base rate plan 2B 514 is based on a zip code the property provided in a user input. The inheritance removal module 202 removes all field values of all rate plans for properties outside the zip code.

The catalog configuration system 130 forms a base rate plan 3X 520 based on inherited properties from the base rate plan 1x 512. For example, the base rate plan 3X 520 is based on the user's age identified in further user input. The inheritance removal module 202 removes all field values of all rate plans (e.g., other rate plans tables) for other user ages besides the one identified in the user input.

Figure 6:
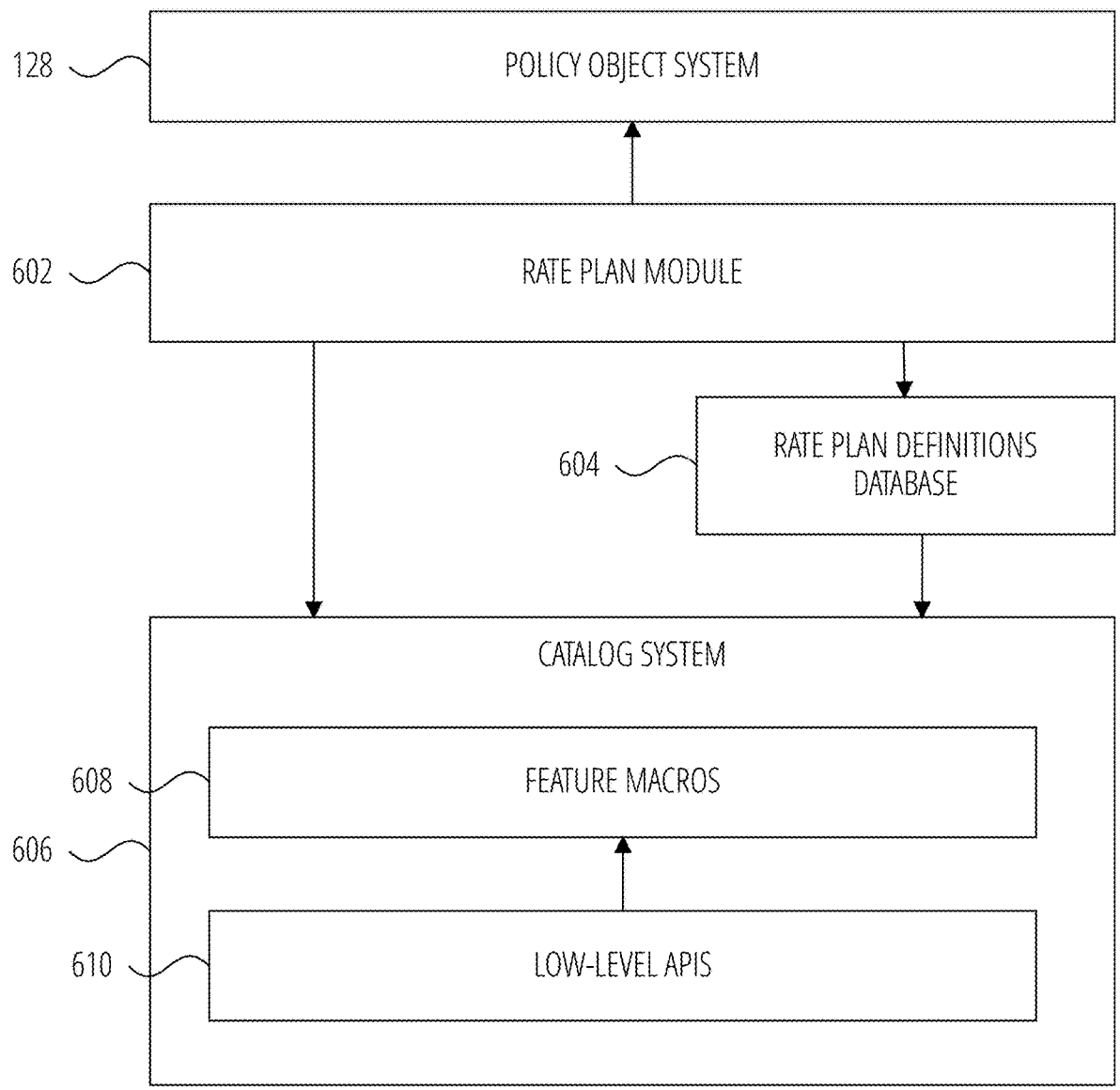
FIG. 6 illustrates an example of an explicit field system in accordance with one example embodiment.

FIG. 6 illustrates an example of an explicit field system in accordance with one example embodiment. The rate plan module 602 forms a rate plan object based on the rate plan definitions database 604 and the catalog system 606. The rate plan definitions database 604 receives a definition of rules pertaining to the rate tables. For example, an administrator can specify a particular discount based on a particular criteria (e.g., pre-payment, age). As such, the rate plan definitions database 604 forms a discount field for a corresponding table rate plan of a rate plan object. In another example embodiment, the rate plan module 602 includes a rate plan configuration that is based on the catalog system 606 and the rate plan definitions database 604.

The rate plan module 602 operates based the explicit field module 204. For example, the rate plan module 602 identifies and retrieves fields of rate plans from the catalog system 606 based on the rate plan definitions database 604 and the user input. The rate plan module 602 forms a rate plan object based on the rate plan definitions database 604, the catalog system 606, and the user input.

The catalog system 606 includes feature macros 608 and low-level APIs 610. The feature macros 608 includes rate plans features. The low-level APIs 610 includes API that are configured to perform operations corresponding to rules, cancellation, document access, schema field definition, calculated fields.

Figure 7:
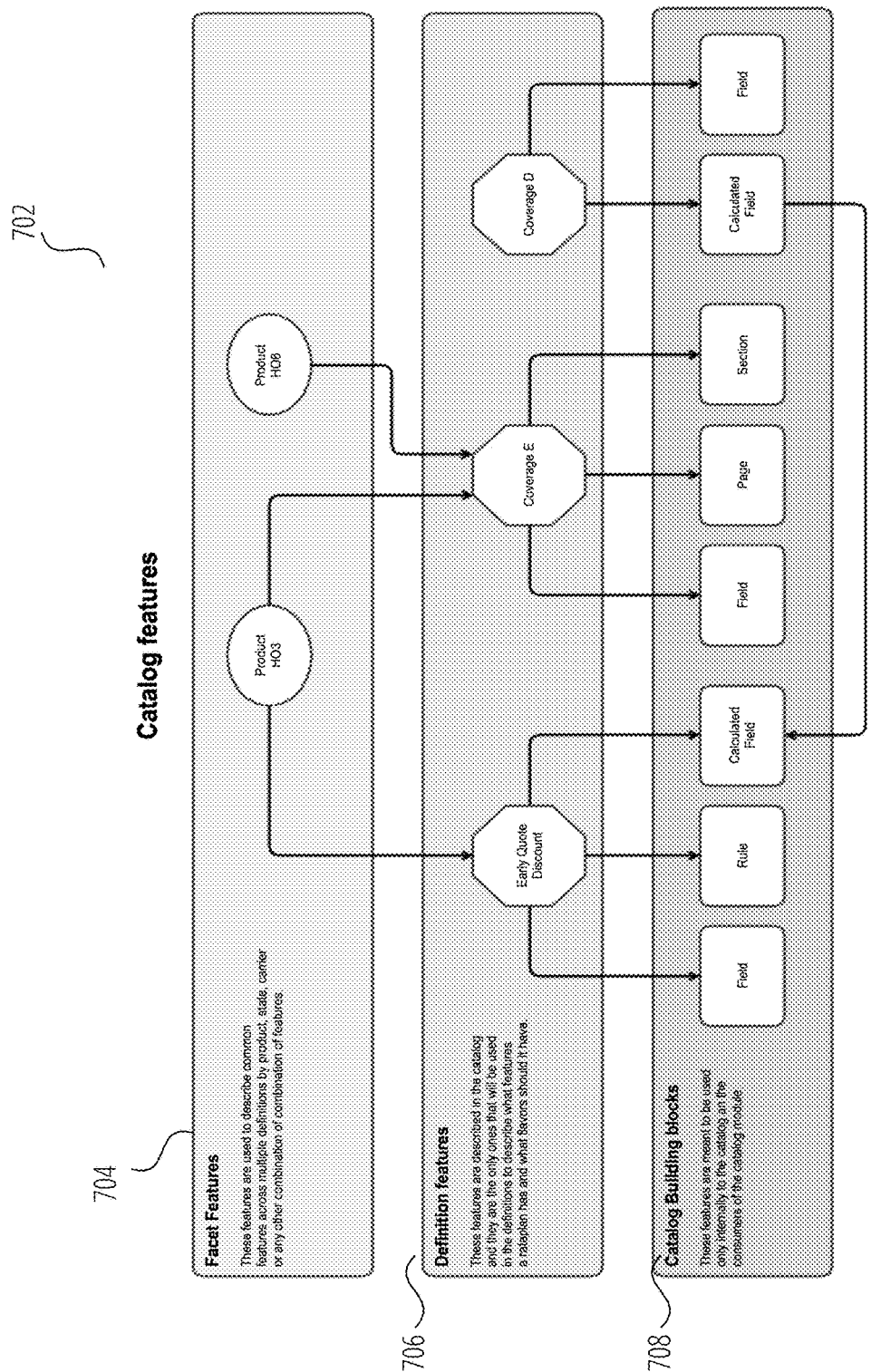
FIG. 7 illustrates an example of catalog features in accordance with one example embodiment.

FIG. 7 illustrates an example of catalog features 702 in accordance with one example embodiment. The catalog features 702 includes a facet features 704, a definition features 706, and a catalog building blocks 708. The facet features 704 includes features that are used to describe common features across multiple definitions by product, state, carrier, or any other combination of features. The definition features 706 describes what features a rate plan has. The catalog building blocks 708 describes fields, rules, and calculated fields.

Figure 8:
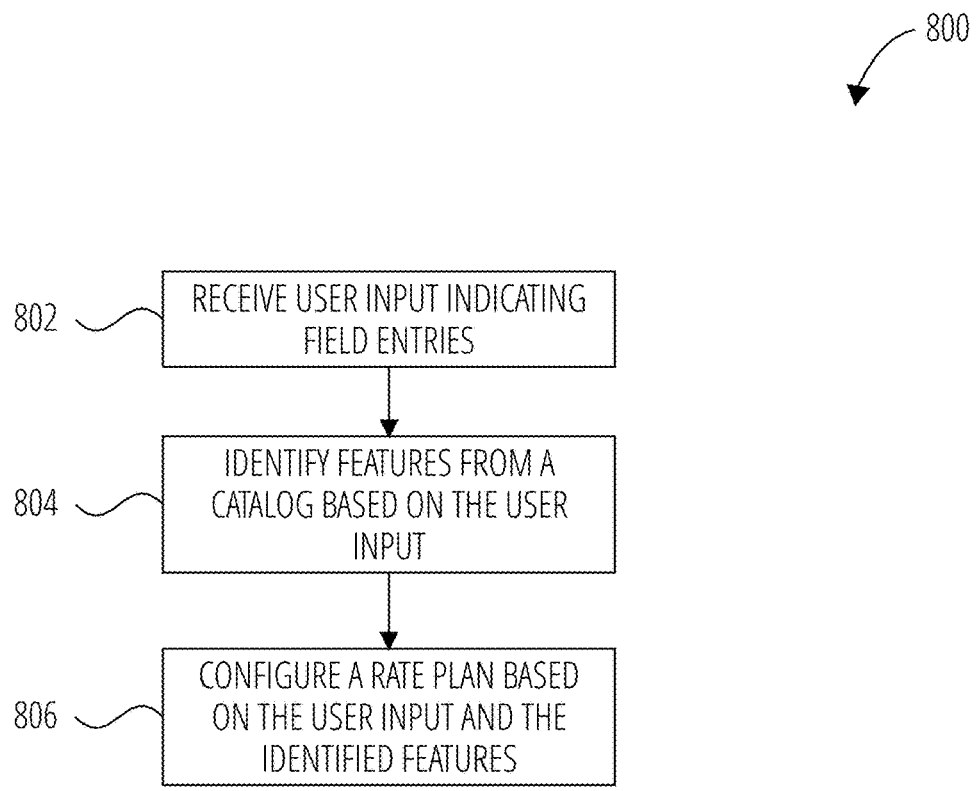
FIG. 8 is a flow diagram illustrating a method for configuring a rate plan based on the user input and the identified features in accordance with one example embodiment.

FIG. 8 is a flow diagram illustrating a method 800 for configuring a rate plan based on the user input and the identified features in accordance with one example embodiment. Operations in the method 800 may be performed by the catalog configuration system 130, using components (e.g., modules, engines) described above with respect to FIG. 2. Accordingly, the method 800 is described by way of example with reference to the catalog configuration system 130. However, it shall be appreciated that at least some of the operations of the method 800 may be deployed on various other hardware configurations or be performed by similar components residing elsewhere. For example, some of the operations may be performed at the client device 106 or at the third-party server 112.

At block 802, the catalog configuration system 130 receives user input indicating field entries (e.g., age of property, zip code). At block 804, the explicit field module 204 identifies features from a primary catalog based on the user input. At block 806, the explicit field module 204 configures a rate plan object based on the user input and the identified features.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 9:
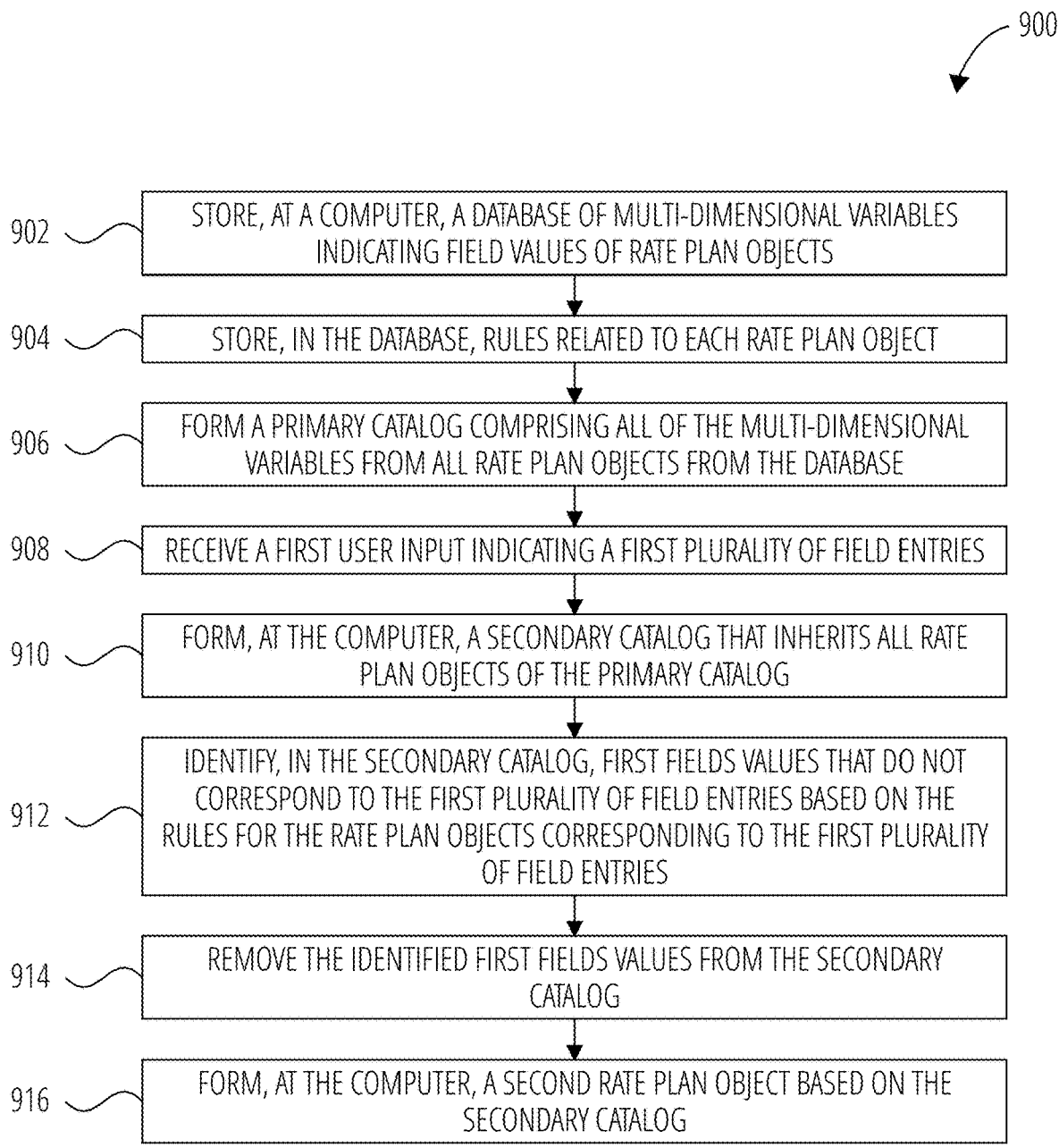
FIG. 9 is a flow diagram illustrating a method for forming a policy object in accordance with one embodiment.

FIG. 9 is a flow diagram illustrating a routine 900 for constructing a policy object in accordance with one example embodiment. Operations in the routine 900 may be performed by the catalog configuration system 130, using Components (e.g., modules, engines) described above with respect to FIG. 2. Accordingly, the routine 900 is described by way of example with reference to the catalog configuration system 130. However, it shall be appreciated that at least some of the operations of the routine 900 may be deployed on various other hardware configurations or be performed by similar Components residing elsewhere. For example, some of the operations may be performed at the client device 106 or at the third-party server 112.

In block 902, routine 900 stores, at a computer, a database of multi-dimensional variables indicating field values of rate plan objects. In block 904, routine 900 stores, in the database, rules related to each rate plan object. In block 906, routine 900 forms a primary catalog comprising all of the multi-dimensional variables from all rate plan objects from the database. In block 908, routine 900 receives a first user input indicating a first plurality of field entries. In block 910, routine 900 forms, at the computer, a secondary catalog that inherits all rate plan objects of the primary catalog. In block 912, routine 900 identifies, in the secondary catalog, first fields values that do not correspond to the first plurality of field entries based on the rules for the rate plan objects corresponding to the first plurality of field entries. In block 914, routine 900 removes the identified first fields values from the secondary catalog. In block 916, routine 900 forms, at the computer, a second rate plan object based on the secondary catalog.

Figure 10:
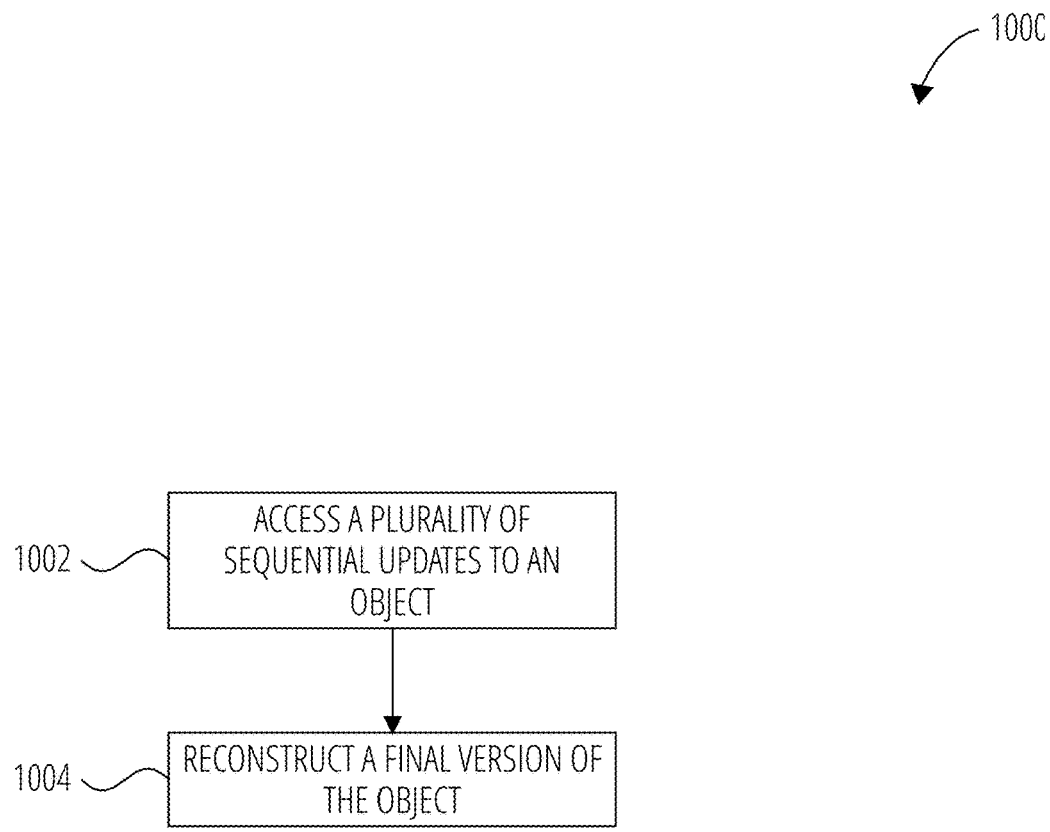
FIG. 10 is a flow diagram illustrating a method for reconstructing a final version of an object in accordance with one example embodiment.

FIG. 10 is a flow diagram illustrating a method for reconstructing a final version of an object in accordance with one example embodiment. Operations in the method 1000 may be performed by the catalog configuration system 130, using components (e.g., modules, engines) described above with respect to FIG. 3 and FIG. 4. Accordingly, the method 1000 is described by way of example with reference to the catalog configuration system 130. However, it shall be appreciated that at least some of the operations of the method 1000 may be deployed on various other hardware configurations or be performed by similar components residing elsewhere. For example, some of the operations may be performed at the client device 106 or at the third-party server 112.

At block 1002, the object database model 306 accesses a sequence of updates to an object. For example, each update indicates a field of change (e.g., value change of an identified attribute, identified attribute, transaction date, and effective date).

At block 1004, the object view model 304 reconstructs a final version of the object based on the updates. The object view model 304 enables a user to access a snapshot of the object at a specific point in time. In one example, the object view model 304 reconstruct a final version of the object by iteratively projecting the values of the attributes for each update into the final version of the object.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 11:
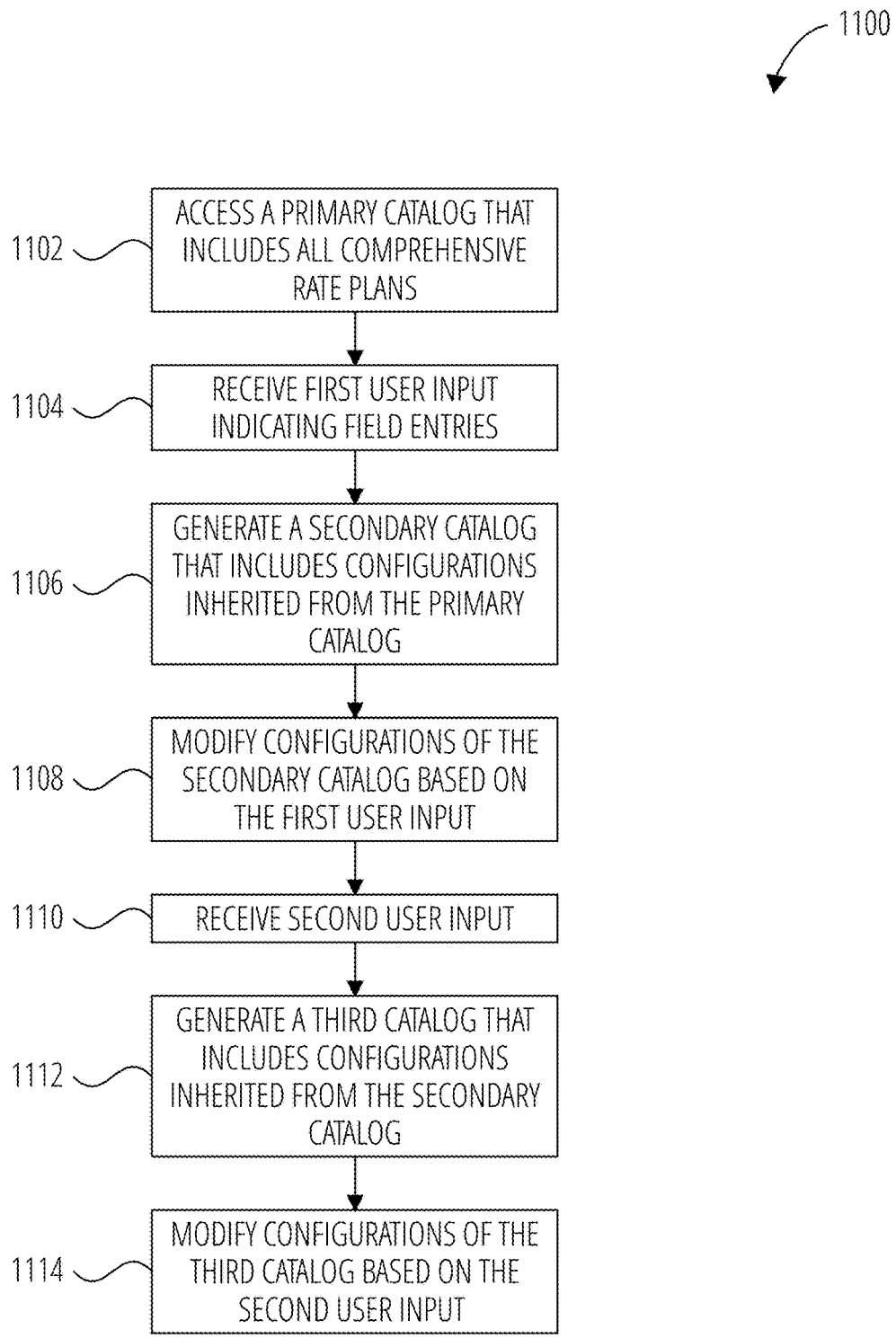
FIG. 11 is a flow diagram illustrating a method for removing inherited features in accordance with one example embodiment.

FIG. 11 is a flow diagram illustrating a method 1100 for reconstructing a final version of an object in accordance with one example embodiment. Operations in the method 1100 may be performed by the catalog configuration system 130, using components (e.g., modules, engines) described above with respect to FIG. 3 and FIG. 4. Accordingly, the method 1100 is described by way of example with reference to the catalog configuration system 130. However, it shall be appreciated that at least some of the operations of the method 1100 may be deployed on various other hardware configurations or be performed by similar components residing elsewhere. For example, some of the operations may be performed at the client device 106 or at the third-party server 112.

At block 1102, the catalog configuration system 130 accesses a primary catalog that includes all comprehensive rate plans. At block 1104, the catalog configuration system 130 receives a first user input indicating field entries. At block 1106, the inheritance removal module 202 generates a secondary catalog that includes configurations inherited from the primary catalog. At block 1108, the inheritance removal module 202 modifies configurations of the secondary catalog based on the first user input. At block 1110, the inheritance removal module 202 receives a second user input. At block 1112, the catalog configuration system 130 generates a third catalog that includes configurations inherited from the secondary catalog. At block 1114, the inheritance removal module 202 modifies configurations of third catalog based on the second user input.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 12:
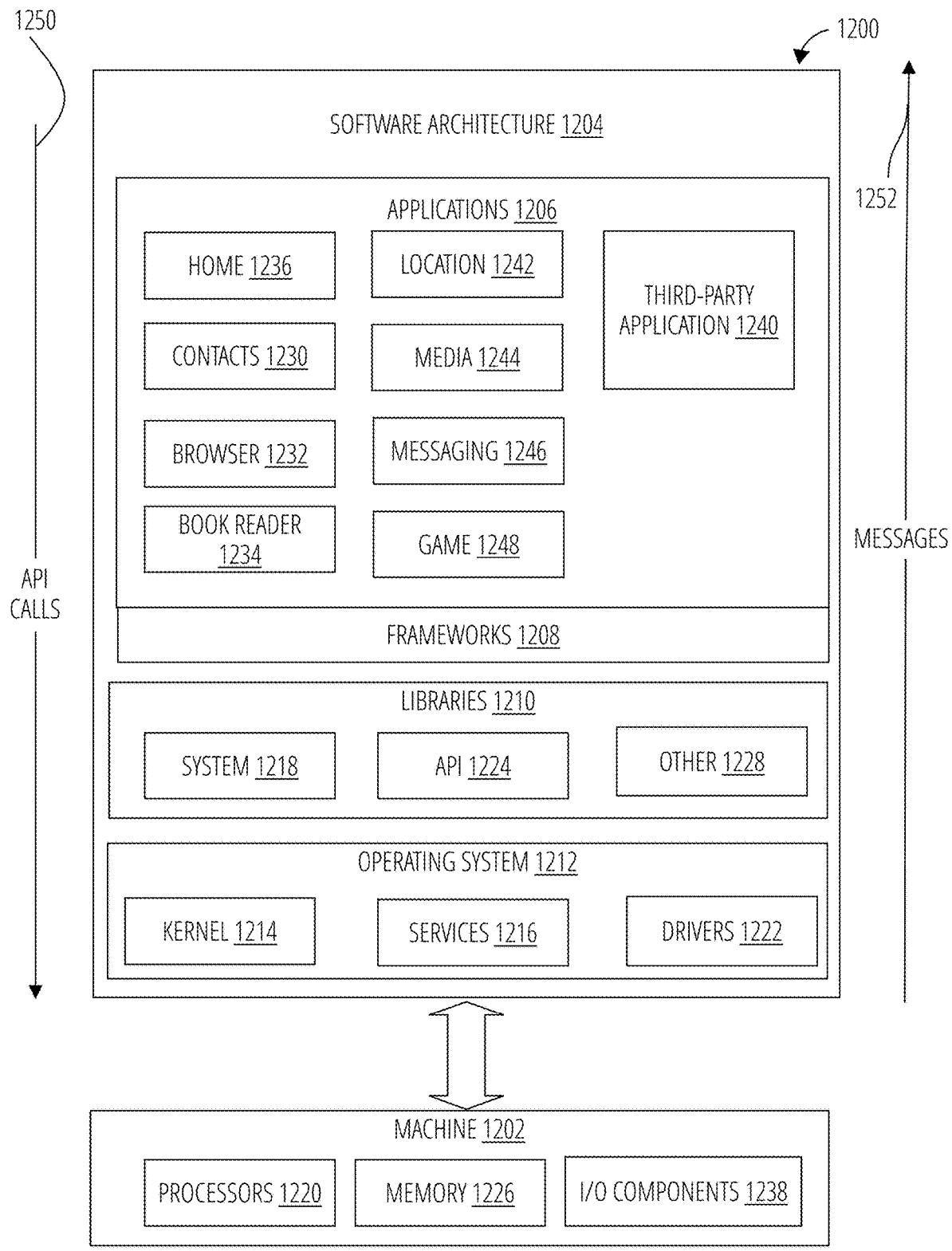
FIG. 12 is block diagram showing a software architecture within which the present disclosure may be implemented, according to an example embodiment.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1210 provide a low-level common infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4). Advanced Video Coding (H.264 or AVC). Moving Picture Experts Group Layer-3 (MP3), Advanced Audio Coding (AAC). Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a high-level common infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example embodiment, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java. or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™. ANDROID™, WINDOWS® Phone, or another mobile operating system. In this example, the third-party application 1240 can invoke the API calls 1250 provided by the operating system 1212 to facilitate functionality described herein.

Figure 13:
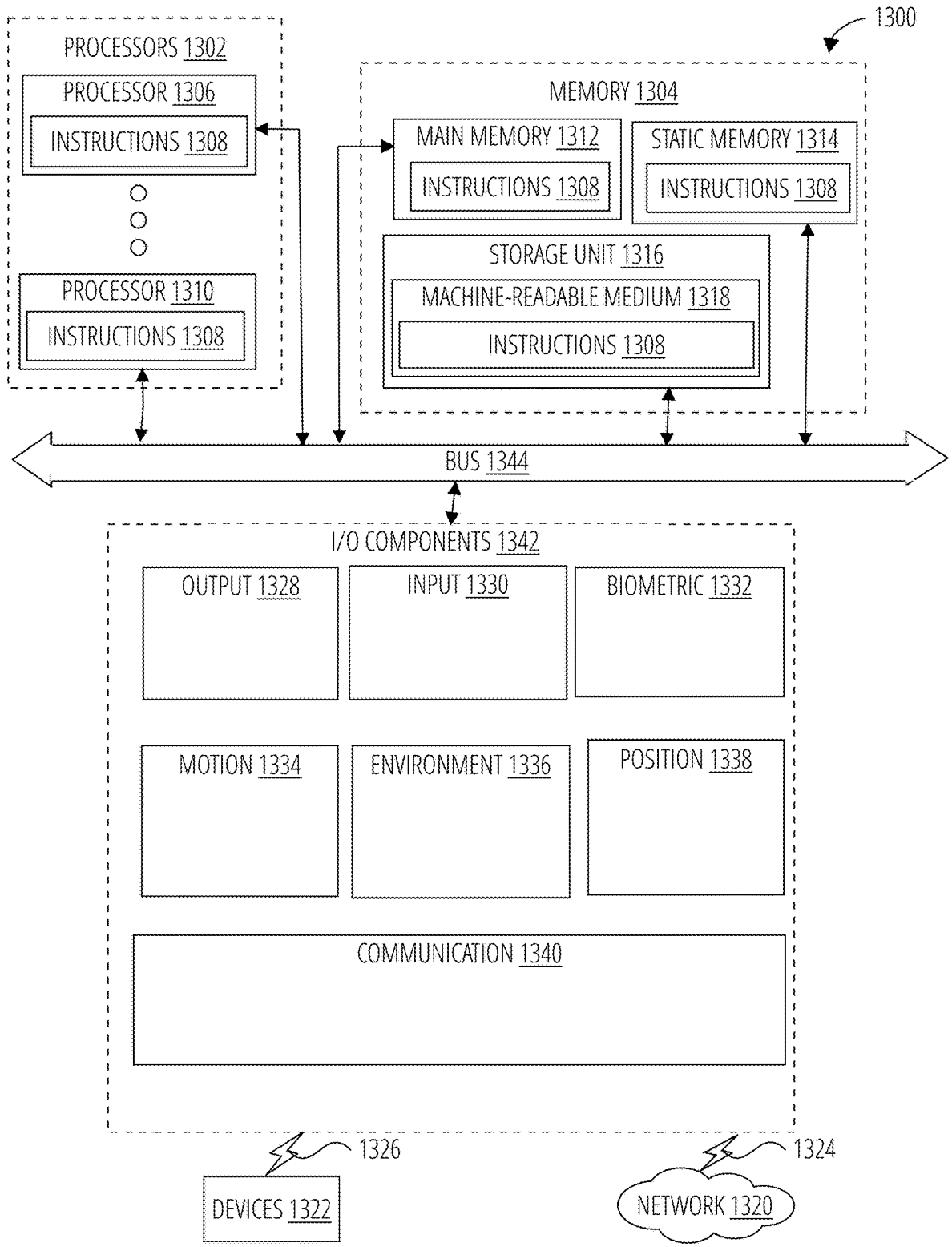
FIG. 13 is a diagrammatic representation of a machine in the form of a computer system within which a set of instructions may be executed for causing the machine to perform any one or more of the methodologies discussed herein, according to an example embodiment.

FIG. 13 is a diagrammatic representation of the machine 1300 within which instructions 1308 (e.g., software, a program, an application, an applet, an app, or other executable code) for causing the machine 1300 to perform any one or more of the methodologies discussed herein may be executed. For example, the instructions 1308 may cause the machine 1300 to execute any one or more of the methods described herein. The instructions 1308 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1308, sequentially or otherwise, that specify actions to be taken by the machine 1300. Further, while only a single machine 1300 is illustrated, the term "machine" shall also be taken to include a collection of machines that individually or jointly execute the instructions 1308 to perform any one or more of the methodologies discussed herein.

The machine 1300 may include processors 1302, memory 1304, and I/O components 1342, which may be configured to communicate with each other via a bus 1344. In an example embodiment, the processors 1302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1306 and a processor 1310 that execute the instructions 1308. The term "processor" is intended to include multi-core processors that may comprise two or more independent processors (sometimes referred to as "cores") that may execute instructions contemporaneously. Although FIG. 13 shows multiple processors 1302, the machine 1300 may include a single processor with a single core, a single processor with multiple cores (e.g., a multi-core processor), multiple processors with a single core, multiple processors with multiples cores, or any combination thereof.

The memory 1304 includes a main memory 1312, a static memory 1314, and a storage unit 1316, both accessible to the processors 1302 via the bus 1344. The main memory 1304, the static memory 1314, and storage unit 1316 store the instructions 1308 embodying any one or more of the methodologies or functions described herein. The instructions 1308 may also reside, completely or partially, within the main memory 1312, within the static memory 1314, within machine-readable medium 1318 within the storage unit 1316, within at least one of the processors 1302 (e.g., within the processor's cache memory), or any suitable combination thereof, during execution thereof by the machine 1300.

The I/O components 1342 may include a wide variety of components to receive input, provide output, produce output, transmit information, exchange information, capture measurements, and so on. The specific I/O components 1342 that are included in a particular machine will depend on the type of machine. For example, portable machines such as mobile phones may include a touch input device or other such input mechanisms, while a headless server machine will likely not include such a touch input device. It will be appreciated that the I/O components 1342 may include many other components that are not shown in FIG. 13. In various example embodiments, the I/O components 1342 may include output components 1328 and input components 1330. The output components 1328 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1330 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1342 may include biometric components 1332, motion components 1334, environmental components 1336, or position components 1338, among a wide array of other components. For example, the biometric components 1332 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 include acceleration sensor components (e.g., accelerometer), gravitation sensor components, rotation sensor components (e.g., gyroscope), and so forth. The environmental components 1336 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1342 further include communication components 1340 operable to couple the machine 1300 to a network 1320 or devices 1322 via a coupling 1324 and a coupling 1326, respectively. For example, the communication components 1340 may include a network interface component or another suitable device to interface with the network 1320. In further examples, the communication components 1340 may include wired communication components, wireless communication components, cellular communication components, Near Field Communication (NFC) components, Bluetooth® components (e.g., Bluetooth® Low Energy). Wi-Fi® components, and other communication components to provide communication via other modalities. The devices 1322 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components. NFC smart tag detection components, optical reader components (e.g., an optical sensor to detect one-dimensional bar codes such as Universal Product Code (UPC) bar code, multi-dimensional bar codes such as Quick Response (QR) code, Aztec code. Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geolocation, location via Wi-Fi® signal triangulation, location via detecting an NFC beacon signal that may indicate a particular location, and so forth.

The various memories (e.g., memory 1304, main memory 1312, static memory 1314, and/or memory of the processors 1302) and/or storage unit 1316 may store one or more sets of instructions and data structures (e.g., software) embodying or used by any one or more of the methodologies or functions described herein. These instructions (e.g., the instructions 1308), when executed by processors 1302, cause various operations to implement the disclosed embodiments.

The instructions 1308 may be transmitted or received over the network 1320, using a transmission medium, via a network interface device (e.g., a network interface component included in the communication components 1340) and using any one of a number of well-known transfer protocols (e.g., hypertext transfer protocol (HTTP)). Similarly, the instructions 1308 may be transmitted or received using a transmission medium via the coupling 1326 (e.g., a peer-to-peer coupling) to the devices 1322.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

EXAMPLES

Example 1 is a computer-implemented method comprising: storing, at a computer, a database of multi-dimensional variables indicating field values of rate plan objects; storing, in the database, rules related to each rate plan object; forming a primary catalog comprising all of the multi-dimensional variables from all rate plan objects from the database; receiving a first user input indicating a first plurality of field entries; forming, at the computer, a secondary catalog that inherits all rate plan objects of the primary catalog; identifying, in the secondary catalog, first fields values that do not correspond to the first plurality of field entries based on the rules for the rate plan objects corresponding to the first plurality of field entries; removing the identified first fields values from the secondary catalog; and forming, at the computer, a second rate plan object based on the secondary catalog.

Example 2 includes example 1, further comprising: receiving a second user input indicating a second plurality of field entries; forming, at the computer, a third catalog that inherits all the rate plan objects of the secondary catalog; identifying, in the third catalog, second fields values that do not correspond to the second plurality of field entries based on the rules for the rate plan objects corresponding to the second plurality of field entries; removing the second identified fields values from the third catalog; and forming, at the computer, a third rate plan object based on the third catalog.

Example 3 includes example 1, wherein the rules indicate a relationship between field values of a first variable with a second variable of the multi-dimensional variables.

Example 4 includes example 1, further comprising: receiving a rate plan definition that identifies a rule between field values of the multi-dimensional variables; updating the rules in the database based on the rate plan definition; and identifying the first fields values that do not correspond to the first plurality of field entries based on the updated rules.

Example 5 includes example 4, wherein the rules are based on the time of the first user input, information about a user related to a property, and information about the property.

Example 6 includes example 1, further comprising: forming, at the computer, a database model of an object based on a plurality of updates to the object, each update indicating a bound status of the update, a transaction date of the update, an effective date of the update, and a value of an attribute in the update, the bound status indicating one of a mutable or immutable commitment of a corresponding update to the object; forming a view model of the object based on the database model of the object by reconstructing values of the attributes of the object from the plurality of updates with immutable bound statuses; receiving a request to replace a first value of a first attribute of the object with a second value of the first attribute of the object; validating, based on a rule, the second value of the first attribute against a third value of a second attribute of a latest version of the object that is formed from the view model of the object with immutable bound status updates, the rule indicating an attribute value relationship rule between the first attribute and the second attribute; in response to validating the request, forming a new update indicating the second value of the first attribute; and updating the object with the new update.

Example 7 includes example 6, further comprising: receiving a query date; and using the view model of the object to project the values of the attributes of the object based on the query date and reconstruct the values of the attributes of the object for the query date.

Example 8 includes example 7, wherein the object comprises a plurality of multi-dimensional nested objects, a first attribute of a first nested object being dependent on a second attribute of a second nested object.

Example 9 includes example 6, wherein the transaction date of a first update indicates a date of the request of the first update received by the computer, wherein the effective date of the update indicates a date when the first update is to take effect.

Example 10 includes example 6, further comprising: forming an open transaction object, the open transaction indicating a first effective date and a mutable bound status; updating and validating one or more attributes of the open transaction object; in response to updating and validating the one or more attributes, persisting the updated attributes of the open transaction to the object; and closing the open transaction object.

Example 11 includes example 10, wherein forming the open transaction object comprises: retrieving the second value of the first attribute of the object; projecting values of the attributes from the updates of the object to reconstruct the values of the attributes of the object for the first effective date; and copying the second value of the first attribute to the first attribute of the object.

Example 12 includes example 11, wherein validating one or more attributes of the open transaction object further comprises: validating the object after copying the second value to the first attribute of the object; in response to the validating, determining an error for the second value: and generating a graphical user interface that indicates the second value is invalid.

Example 13 includes example 11, wherein validating one or more attributes of the open transaction object further comprises: validating the object after copying the second value to the first attribute of the object in the open transaction; and in response to the validating, copying the second value of the first attribute to the new update.

Example 14 includes example 11, wherein validating one or more attributes of the open transaction object further comprises: validating the object after copying the second value to the first attribute of the object in the open transaction; verifying that the open transaction indicates the first effective date and the mutable bound status; and in response to the validating and verifying, copying the second value of the first attribute and a first effective date of the effective date attribute indicating the first effective date of the second value to the new update.

Example 15 includes example 6, wherein updating the object with the new update further comprises: forming the new update in the database model of the object, the new update indicating the second value of the first attribute, the first effective date of the effective date attribute for the second value of the first attribute of the object, and an immutable bound status.

Example 16 is a computer-implemented method comprising: receiving, at a computer, a rate plan definition that identifies a rule between field values of the multi-dimensional variables; receiving, at the computer, a first user input indicating a first plurality of field entries; accessing, at the computer, a database of multi-dimensional variables indicating field values of a plurality of rate plan objects; identifying first fields values that correspond to the first plurality of field entries based on the rate plan definition; and forming a user rate plan object that explicitly includes only the identified first field values.

Example 17 is s computer-implemented method of example 16, further comprising: storing, in the database, the user rate plan; and forming a primary catalog comprising only the field values of the plurality of rate plan objects, the primary catalog associated with a user of the first user input.

Example 18 is a computer-implemented method of example 16, further comprising: forming, at the computer, a database model of an object based on a plurality of updates to the object, each update indicating a bound status of the update, a transaction date of the update, an effective date of the update, and a value of an attribute in the update, the bound status indicating one of a mutable or immutable commitment of a corresponding update to the object; forming a view model of the object based on the database model of the object by reconstructing values of the attributes of the object from the plurality of updates with immutable bound statuses; receiving a request to replace a first value of a first attribute of the object with a second value of the first attribute of the object; validating, based on a rule, the second value of the first attribute against a third value of a second attribute of a latest version of the object that is formed from the view model of the object with immutable bound status updates, the rule indicating an attribute value relationship rule between the first attribute and the second attribute; in response to validating the request, forming a new update indicating the second value of the first attribute; and updating the object with the new update.

Example 19 is a non-transitory computer-readable storage medium, the computer-readable storage medium including instructions that when executed by a computer, cause the computer to perform operations comprising: store, at a computer, a database of multi-dimensional variables indicating field values of a first rate plan object; store, in the database, rules related to each rate plan object; form a primary catalog comprising all of the multi-dimensional variables from all rate plan objects from the database; receive a first user input indicating a first plurality of field entries; form, at the computer, a secondary catalog that inherits the properties of the primary catalog; identify first fields values that do not correspond to the first plurality of field entries based on the rules; remove the identified first fields values from the secondary catalog; and form, at the computer, a second rate plan object based on the secondary catalog.

Example 20 is a non-transitory computer-readable storage medium, the computer-readable storage medium including instructions that when executed by a computer, cause the computer to perform operations comprising: receive, at a computer, a rate plan definition that identifies a rule between field values of the multi-dimensional variables; receive, at the computer, a first user input indicating a first plurality of field entries; access, at the computer, a database of multi-dimensional variables indicating field values of a plurality of rate plan objects; identify first fields values that correspond to the first plurality of field entries based on the rate plan definition; and form a user rate plan object that explicitly includes only the identified first field values.

What is claimed is:

1. A computer-implemented method comprising:
storing, at a computer, a database of multi-dimensional variables indicating field values of rate plan objects;
storing, in the database, rules related to each rate plan object;
forming a primary catalog comprising all of the multi-dimensional variables from all rate plan objects from the database;
receiving a first user input indicating a first plurality of field entries;
forming, at the computer, a secondary catalog that inherits all rate plan objects of the primary catalog;
identifying, in the secondary catalog, first fields values that do not correspond to the first plurality of field entries based on the rules for the rate plan objects corresponding to the first plurality of field entries;
removing the identified first fields values from the secondary catalog;
forming, at the computer, a second rate plan object based on the secondary catalog;
receiving a second user input indicating a second plurality of field entries;
forming, at the computer, a third catalog that inherits all the rate plan objects of the secondary catalog;

identifying, in the third catalog, second fields values that do not correspond to the second plurality of field entries based on the rules for the rate plan objects corresponding to the second plurality of field entries;

removing the second identified fields values from the third catalog; and forming, at the computer, a third rate plan object based on the third catalog.

2. The computer-implemented method of claim 1, wherein the rules indicate a relationship between field values of a first variable with field values of a second variable of the multi-dimensional variables.

3. The computer-implemented method of claim 1, further comprising:

receiving a rate plan definition that identifies a rule between field values of the multi-dimensional variables;

updating the rules in the database based on the rate plan definition; and identifying the first fields values that do not correspond to the first plurality of field entries based on the updated rules.

4. The computer-implemented method of claim 3, wherein the rules are based on the time of the first user input, information about a user, and information about a property.

5. The computer-implemented method of claim 1, further comprising:

forming, at the computer, a database model of an object based on a plurality of updates to the object, each update indicating a bound status of the update, a transaction date of the update, an effective date of the update, and a value of an attribute in the update, the bound status indicating one of a mutable or immutable commitment of a corresponding update to the object;

forming a view model of the object based on the database model of the object by reconstructing values of the attributes of the object from the plurality of updates with immutable bound statuses;

receiving a request to replace a first value of a first attribute of the object with a second value of the first attribute of the object;

validating, based on a rule, the second value of the first attribute against a third value of a second attribute of a latest version of the object that is formed from the view model of the object with immutable bound status updates, the rule indicating an attribute value relationship rule between the first attribute and the second attribute;

in response to validating the request, forming a new update indicating the second value of the first attribute; and updating the object with the new update.

6. The computer-implemented method of claim 5, further comprising:

receiving a query date; and using the view model of the object to project the values of the attributes of the object based on the query date and reconstruct the values of the attributes of the object for the query date.

7. The computer-implemented method of claim 6, wherein the object comprises a plurality of multi-dimensional nested objects, a first attribute of a first nested object being dependent on a second attribute of a second nested object.

8. The computer-implemented method of claim 5, wherein the transaction date of a first update indicates a date of the request of the first update received by the computer, wherein the effective date of the update indicates a date when the first update is to take effect.

9. The computer-implemented method of claim 5, further comprising:

forming an open transaction object, the open transaction indicating a first effective date and a mutable bound status;

updating and validating one or more attributes of the open transaction object; and in response to updating and validating the one or more attributes, persisting the updated attributes of the open transaction to the object.

10. The computer-implemented method of claim 9, wherein forming the open transaction object comprises:

retrieving the second value of the first attribute of the object;

projecting values of the attributes from the updates of the object to reconstruct the values of the attributes of the object for the first effective date; and copying the second value of the first attribute to the first attribute of the object.

11. The computer-implemented method of claim 10, wherein validating one or more attributes of the open transaction object further comprises:

validating the object after copying the second value to the first attribute of the object;

in response to the validating, determining an error for the second value; and generating a graphical user interface that indicates the second value is invalid.

12. The computer-implemented method of claim 10, wherein validating one or more attributes of the open transaction object further comprises:

validating the object after copying the second value to the first attribute of the object in the open transaction; and in response to the validating, copying the second value of the first attribute to the new update.

13. The computer-implemented method of claim 10, wherein validating one or more attributes of the open transaction object further comprises:

validating the object after copying the second value to the first attribute of the object in the open transaction;

verifying that the open transaction indicates the first effective date and the mutable bound status; and in response to the validating and verifying, copying the second value of the first attribute and a first effective date of the effective date attribute indicating the first effective date of the second value to the new update.

14. The computer-implemented method of claim 5, wherein updating the object with the new update further comprises:

forming the new update in the database model of the object, the new update indicating the second value of the first attribute, the first effective date of the effective date attribute for the second value of the first attribute of the object, and an immutable bound status.

15. A computer-implemented method comprising:

receiving, at a computer, a rate plan definition that identifies a rule between field values of the multi-dimensional variables;

receiving, at the computer, a first user input indicating a first plurality of field entries;

accessing, at the computer, a primary database of multi-dimensional variables indicating field values of a plurality of rate plan objects;

identifying first fields values that correspond to the first plurality of field entries based on the rate plan definition;

forming a first user rate plan object that explicitly includes only the identified first field values;

receiving, at the computer, a second user input indicating a second plurality of field entries;

accessing, at the computer, a second database that inherits all the rate plan objects of the primary database;

identifying, in the second database, second fields values that do not correspond to the second plurality of field entries based on the rules for the rate plan objects corresponding to the first plurality of field entries;

removing the second identified fields values from the second database; and forming, at the computer, a second rate plan object based on the second database.

16. The computer-implemented method of claim 15, further comprising:

storing, in the database, the first user rate plan; and forming a primary catalog comprising only the field values of the plurality of rate plan objects, the primary catalog associated with a user of the first user input.

17. The computer-implemented method of claim 15, further comprising:

forming, at the computer, a database model of an object based on a plurality of updates to the object, each update indicating a bound status of the update, a transaction date of the update, an effective date of the update, and a value of an attribute in the update, the bound status indicating one of a mutable or immutable commitment of a corresponding update to the object;

forming a view model of the object based on the database model of the object by reconstructing values of the attributes of the object from the plurality of updates with immutable bound statuses;

receiving a request to replace a first value of a first attribute of the object with a second value of the first attribute of the object;

validating, based on a rule, the second value of the first attribute against a third value of a second attribute of a latest version of the object that is formed from the view model of the object with immutable bound status updates, the rule indicating an attribute value relationship rule between the first attribute and the second attribute;

in response to validating the request, forming a new update indicating the second value of the first attribute; and updating the object with the new update.

18. A non-transitory computer-readable storage medium, the computer-readable storage medium including instructions that when executed by a computer, cause the computer to perform operations comprising:

store, at a computer, a database of multi-dimensional variables indicating field values of rate plan objects;

store, in the database, rules related to each rate plan object;

form a primary catalog comprising all of the multi-dimensional variables from all rate plan objects from the database;

receive a first user input indicating a first plurality of field entries;

form, at the computer, a secondary catalog that inherits all rate plan objects of the primary catalog;

identify, in the secondary catalog, first fields values that do not correspond to the first plurality of field entries based on the rules for the rate plan objects corresponding to the first plurality of field entries;

remove the identified first fields values from the secondary catalog;

form, at the computer, a second rate plan object based on the secondary catalog;

receive a second user input indicating a second plurality of field entries;

form, at the computer, a third catalog that inherits all the rate plan objects of the secondary catalog;

identify, in the third catalog, second fields values that do not correspond to the second plurality of field entries based on the rules for the rate plan objects corresponding to the second plurality of field entries;

remove the second identified fields values from the third catalog; and form, at the computer, a third rate plan object based on the third catalog.

19. A non-transitory computer-readable storage medium, the computer-readable storage medium including instructions that when executed by a computer, cause the computer to perform operations comprising:

receive, at a computer, a rate plan definition that identifies a rule between field values of the multi-dimensional variables;

receive, at the computer, a first user input indicating a first plurality of field entries;

access, at the computer, a primary database of multi-dimensional variables indicating field values of a plurality of rate plan objects;

identify first fields values that correspond to the first plurality of field entries based on the rate plan definition;

form a first user rate plan object that explicitly includes only the identified first field values;

receive, at the computer, a second user input indicating a second plurality of field entries;

access, at the computer, a second database that inherits all the rate plan objects of the primary database;

identify, in the second database, second fields values that do not correspond to the second plurality of field entries based on the rules for the rate plan objects corresponding to the first plurality of field entries;

remove the second identified fields values from the second database; and form, at the computer, a second rate plan object based on the second database.

* * * * *